(12) United States Patent
Lacava et al.

(10) Patent No.: US 11,165,571 B2
(45) Date of Patent: Nov. 2, 2021

(54) TRANSMITTING AUTHENTICATION DATA OVER AN AUDIO CHANNEL

(71) Applicant: EMC IP Holding Company LLC, Hopkinton, MA (US)

(72) Inventors: Joseph P. Lacava, Alexandria, VA (US); Kevin Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 331 days.

(21) Appl. No.: 16/258,162

(22) Filed: Jan. 25, 2019

(65) Prior Publication Data

US 2020/0244452 A1    Jul. 30, 2020

(51) Int. Cl.
*H04L 9/08* (2006.01)
*H04L 29/06* (2006.01)
(Continued)

(52) U.S. Cl.
CPC ............ *H04L 9/0875* (2013.01); *H04B 11/00* (2013.01); *H04L 9/12* (2013.01); *H04L 63/0876* (2013.01); *H04L 63/16* (2013.01); *H04L 63/18* (2013.01)

(58) Field of Classification Search
CPC ....... H04L 9/0875; H04L 9/12; H04L 9/3215; H04L 9/3231; H04L 9/3213; H04L 63/16;
(Continued)

(56) References Cited

U.S. PATENT DOCUMENTS

| 4,720,860 A | 1/1988 | Weiss |
| 5,168,520 A | 12/1992 | Weiss |

(Continued)

FOREIGN PATENT DOCUMENTS

| EP | 1465057 A2 | 3/2004 |
| EP | 2026494 A1 | 2/2009 |

(Continued)

OTHER PUBLICATIONS

J.-C. Liou et al., "On Improving Feasibility and Security Measures of Online Authentication," International Journal of Advanced Computer Science and Technology (IJACST), 2010, pp. 6-16, vol. 2, No. 4.

(Continued)

*Primary Examiner* — Vu V Tran
(74) *Attorney, Agent, or Firm* — Ryan, Mason & Lewis, LLP (57) ABSTRACT

A method includes receiving, over an audio channel at a first audio input device, a first audio signal. The method also includes analyzing the first audio signal to identify at least a first portion of authentication data transmitted from an authentication token. The method further includes verifying transmittal of the authentication data by the authentication token utilizing at least a second audio signal. The second audio signal is received at a second audio input device, and the second audio signal comprises at least a second portion of the authentication data. The method further includes providing the authentication data to a validating application responsive to verifying transmittal of the authentication data by the authentication token.

20 Claims, 7 Drawing Sheets

(51) Int. Cl.
*H04W 12/06* (2021.01)
*H04W 12/63* (2021.01)
*H04L 9/32* (2006.01)
*H04B 11/00* (2006.01)
*H04L 9/12* (2006.01)

(58) Field of Classification Search
CPC . H04L 63/18; H04L 63/0853; H04L 63/0861; H04L 63/0876; H04B 11/00; H04W 12/06; H04W 12/63
See application file for complete search history.

(56) References Cited

U.S. PATENT DOCUMENTS

| | | | |
|---|---|---|---|
| 5,361,062 A | 12/1994 | Weiss et al. | |
| 5,428,349 A | 6/1995 | Baker | |
| 5,870,471 A | 2/1999 | Wootton et al. | |
| 7,409,705 B2 | 8/2008 | Ueda et al. | |
| 7,849,323 B2 | 12/2010 | Field et al. | |
| 8,224,887 B2 | 7/2012 | Singerle, Jr. | |
| 8,245,292 B2 | 8/2012 | Buer | |
| 8,504,842 B1 | 8/2013 | Meacham | |
| 8,572,713 B2 | 10/2013 | Buer | |
| 8,752,146 B1 | 6/2014 | van Dijk et al. | |
| 8,752,153 B2 | 6/2014 | Vysogorets et al. | |
| 8,959,195 B1 | 2/2015 | Niranjan et al. | |
| 9,147,063 B1 | 9/2015 | Florissi et al. | |
| 9,191,386 B1 | 11/2015 | Yaron et al. | |
| 9,225,717 B1 | 12/2015 | Brainard et al. | |
| 9,411,948 B1 | 8/2016 | Suresh et al. | |
| 9,786,291 B2 * | 10/2017 | Narayan | H04B 11/00 |
| 2003/0204541 A1 | 10/2003 | Shackleford et al. | |
| 2003/0204726 A1 | 10/2003 | Kefford et al. | |
| 2004/0081078 A1 | 4/2004 | McKnight et al. | |
| 2007/0061589 A1 | 3/2007 | Ulmer et al. | |
| 2007/0088952 A1 | 4/2007 | Hewitt et al. | |
| 2007/0180504 A1 | 8/2007 | Hung | |
| 2007/0186105 A1 | 8/2007 | Bailey et al. | |
| 2008/0009345 A1 | 1/2008 | Bailey et al. | |
| 2008/0148057 A1 | 6/2008 | Hauw | |
| 2009/0249454 A1 * | 10/2009 | Yamamoto | H04W 12/06 726/5 |
| 2009/0282247 A1 | 11/2009 | Kirkup et al. | |
| 2009/0289916 A1 | 11/2009 | Dai | |
| 2010/0031200 A1 | 2/2010 | Chen | |
| 2010/0110837 A1 | 5/2010 | Jung et al. | |
| 2010/0150348 A1 | 6/2010 | Fairbanks et al. | |
| 2010/0242104 A1 | 9/2010 | Wankmueller et al. | |
| 2011/0119746 A1 | 5/2011 | Yang | |
| 2013/0014248 A1 | 1/2013 | McLaughlin et al. | |
| 2013/0130714 A1 | 5/2013 | Huibers et al. | |
| 2014/0129231 A1 * | 5/2014 | Herring | G06Q 20/401 704/270.1 |
| 2014/0181938 A1 | 6/2014 | Hrybyk et al. | |
| 2016/0315771 A1 * | 10/2016 | Chalamala | H04L 9/321 |
| 2017/0098457 A1 * | 4/2017 | Zad Issa | H04R 3/005 |
| 2018/0054261 A1 * | 2/2018 | Ding | H04W 12/06 |
| 2019/0122670 A1 * | 4/2019 | Roberts | G06F 21/32 |
| 2019/0386984 A1 * | 12/2019 | Thakkar | H04L 63/18 |
| 2019/0392829 A1 * | 12/2019 | Wei | G06F 3/167 |
| 2021/0028867 A1 * | 1/2021 | Madan | H04B 11/00 |

FOREIGN PATENT DOCUMENTS

| | | |
|---|---|---|
| GB | 2433147 A | 6/2007 |
| WO | 2011124275 A1 | 10/2011 |
| WO | 2012001428 A1 | 1/2012 |

OTHER PUBLICATIONS

A.J. Menezes et al., "Handbook of Applied Cryptography," CRC Press, Oct. 1996, 794 pages.

P. Mell et al., "The NIST Definition of Cloud Computing," U.S. Department of Commerce, Computer Security Division, National Institute of Standards and Technology, Special Publication 800-145, Sep. 2011, 7 pages.

IBM Technical Disclosure Bulletin, "Remote Terminal Computer Communication Security," TSB-ACC-No. NN73122312, Dec. 1, 1973, pp. 2312-2314, vol. 16, No. 7.

The Security Division of EMC, "RSA SecurID 800 Authenticator—Hybrid Authenticator that Provides a Seamless User Experience Across Multiple Applications Using Multiple Credentials," Jan. 9, 2019, 2 pages.

R. Nandakumar et al., "Dhwani : Secure Peer-to-Peer Acoustic NFC," Proceedings of the ACM Conference on SIGCOMM (SIGCOMM), Aug. 12-16, 2013, pp. 63-74.

* cited by examiner

TRANSMITTING AUTHENTICATION DATA OVER AN AUDIO CHANNEL

FIELD

The field relates generally to information security, and more particularly to authentication.

BACKGROUND

Multi-factor authentication techniques use various factors for authentication. These factors may include something-you-know such as a password, something-you-have such as a smart card or token, and something-you-are such as a fingerprint or other biometric. The use of the something-you-have factor often requires a user to transcribe data from an authentication device such as a smart card or token to a validating application. Thus, the something-you-have factor may be cumbersome and error prone.

SUMMARY

Illustrative embodiments of the present invention provide techniques for transmitting authentication data over an audio channel. For example, some embodiments advantageously facilitate the use of authentication involving a something-you-have factor, reducing the possibilities for errors while also increasing security by increasing the complexity of the something-you-have authentication factor data.

In one embodiment, a method comprises receiving, over an audio channel at a first audio input device, a first audio signal. The method also comprises analyzing the first audio signal to identify at least a first portion of authentication data transmitted from an authentication token and verifying transmittal of the authentication data by the authentication token utilizing at least a second audio signal, the second audio signal being received at a second audio input device, the second audio signal comprising at least a second portion of the authentication data. The method further comprises providing the authentication data to a validating application responsive to verifying transmittal of the authentication data by the authentication token. The method is performed by at least one processing device comprising a processor coupled to a memory.

In another embodiment, a method comprises generating authentication data for use in authentication to a validating application, converting the authentication data to at least one audio signal, and transmitting, over an audio channel via an audio output device, the at least one audio signal, the transmitted audio signal being processed to obtain the authentication data and to provide the authentication data to the validating application. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

The term "passcode" as used herein is intended to include authentication information such as one-time passcodes (OTPs), or more generally any other information that may be utilized for cryptographic authentication purposes. Such passcodes may therefore include numerical tokencodes, alphanumeric passwords, passphrases, etc. Although the illustrative embodiments will be described below primarily in the context of OTPs, it is to be appreciated that the invention is more broadly applicable to any other type of passcode.

Illustrative embodiments utilize audio as a method of transmitting and receiving authentication data such as OTPs. Advantageously, embodiments allow for removing the "human element" from the process of transmitting and receiving OTPs or other authentication data, easing usability while also allowing for higher data transmission rates. Due to the ubiquity of microphones in devices that typically validate OTPs or other authentication data (e.g., laptops, desktops, smartphones, tablets, wearable devices such as smartwatches, etc.) and the availability or ease of adding a speaker to an authentication device such as an authentication token, the techniques described herein for transmitting authentication data over an audio channel may be widely applicable. Further, the techniques described herein may enable use cases that are not possible today (e.g., with devices that have a microphone but not a keyboard).

One example of an authentication device that transmits authentication data such as OTPs is an RSA SecurID® token, which may generate the authentication data in the form of numerical values. The numerical values generated using the SecurID token are typically manually transcribed by a user from the device that generated them to the system that will validate such values. In some embodiments, the SecurID token may be implemented as a hardware token, or as a software application running on a device (e.g., a mobile computing device). The system that will validate such values may be another, physically distinct device that is running an application that requires such values for authentication. Consider, as an example, a use case scenario wherein the SecurID token is implemented as an application running on a user's smartphone, while the validating device is that user's laptop running a virtual private network (VPN) client. Using the techniques described herein, the user's smartphone can emit sounds that are picked up by a microphone on the user's laptop that is attempting to create a VPN connection. Thus, the user would not be required to manually enter the numerical values that are generated by the SecurID token. Moreover, by doing so authentication could be made stronger as the length or complexity of the OTP or other authentication data may be increased as described in further detail below.

It should be appreciated that the techniques described herein are not limited to use with transmitting OTPs or authentication data from a SecurID token. Instead, the techniques described herein may be used to transmit OTPs or authentication data from various other types of authentication tokens, smartcards and other devices (e.g., including from software applications running on these and other devices) to devices that utilize the OTPs or other authentication data for authentication to a validating application.

Figure 1:
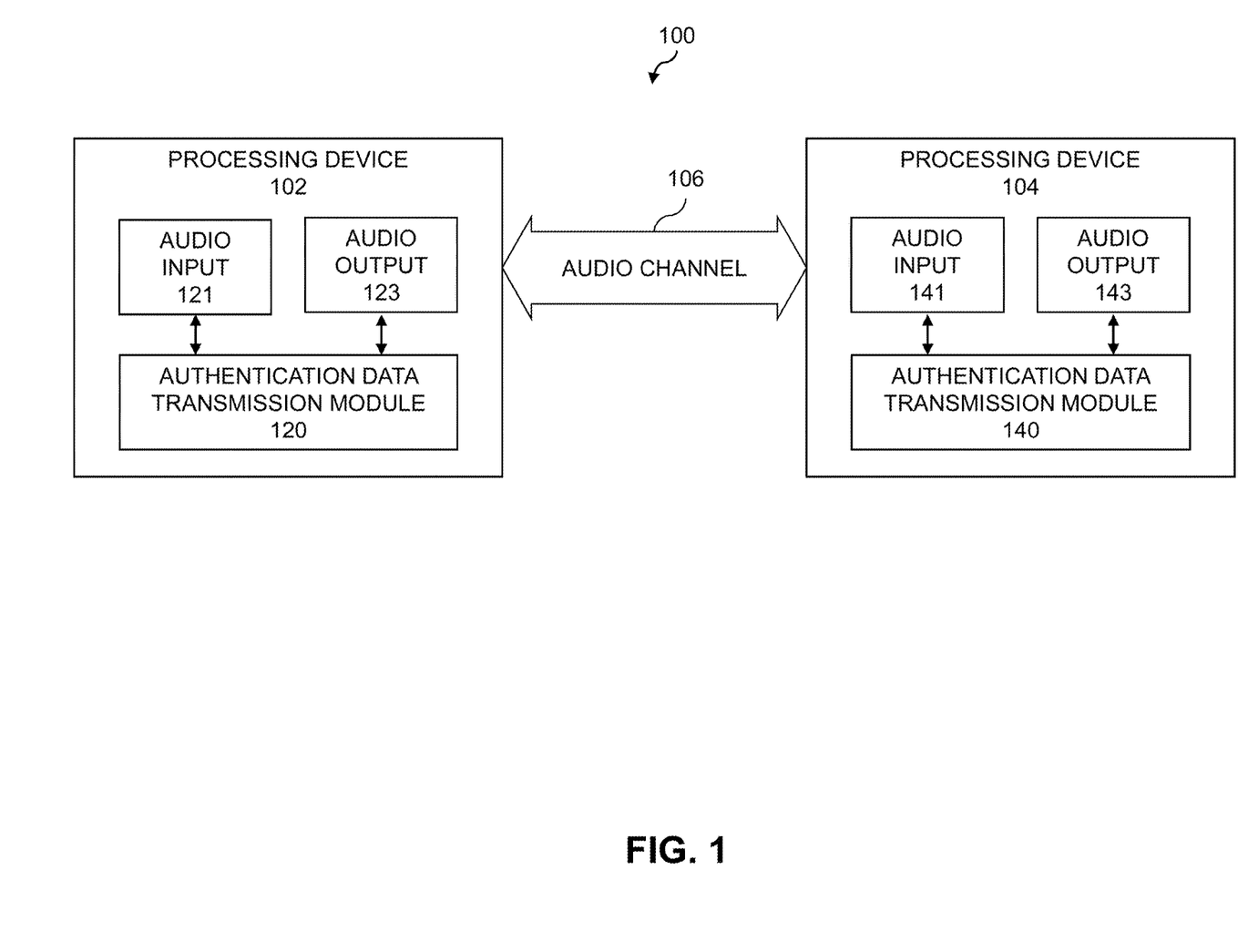
FIG. 1 is a block diagram of an information processing system for transmitting authentication data over an audio channel in an illustrative embodiment of the invention.

FIG. 1 illustrates an information processing system 100 including processing devices 102 and 104 comprising respective authentication data transmission modules 120 and 140. The authentication data transmission modules 120 and 140 of processing devices 102 and 104 are configured to utilize respective audio input devices 121 and 141 to receive OTPs or other authentication data transmitted over audio channel 106, and to utilize respective audio output devices 123 and 143 to transmit OTPs or other authentication data over audio channel 106.

The audio input devices 121 and 141 may include, by way of example, microphones, microphone ports, etc. The audio output devices 123 and 143 may include, by way of example, speakers, headphone ports, etc. It should also be appreciated that, in some instances, one device or piece of hardware may provide both audio input and audio output functionality, and therefore may serve as both an audio input device and an audio output device. For example, some headphone ports or jacks may be configured to both send and receive audio data or signals.

The transmission of OTPs or other authentication data from the processing devices 102 and 104 takes place over audio channel 106 as noted above. The processing device 102, for example, may send an OTP or other authentication data via audio output device 123 to the audio input device 141 of the processing device 104 over audio channel 106. As will be described in further detail below, the audio channel 106 in some embodiments may be wireless or "over the air" by emitting sounds from the audio output device 123 of the processing device 102. This over the air transmission may take place in human-audible frequencies (e.g., so that the user knows when authentication data is being transmitted) or may take place in human-inaudible frequencies (e.g., to avoid bothering the user), or over combinations of human-audible and human-inaudible frequencies.

In other embodiments, the audio channel 106 may be a wired channel, such as where the audio output device 123 of the processing device 102 is a headphone jack or port (e.g., a standard 3.5 millimeter (mm) headphone port) and where the audio input device 141 of the processing device 104 is a microphone jack or port. In some cases, a single physical audio port may be configured to both transmit and receive audio data (e.g., a headphone or microphone port that is configured to both transmit and receive audio data or signals).

Various other types of audio input devices 121 and 141 and audio output devices 123 and 143 may be used to communicate or transmit OTPs or other authentication data over the audio channel 106 in other embodiments, including combinations of speakers, microphones, headphone or microphone ports, etc.

The term "processing device" as used herein is intended to be construed broadly, so as to encompass a wide variety of devices. Processing devices include, by way of example, authentication tokens, smartcards, radio frequency identification (RFID) tags and other lightweight devices. Processing devices also include computing devices, including desktop computing devices and mobile computing devices such as smartphones or other cell phones, tablets, laptops, etc.

In the system 100, the processing device 102 is assumed to be an authenticating device and the processing device 104 is assumed to be a verifying device, in that the processing device 102 provides an OTP or other authentication data over audio channel 106 to the processing device 104. The processing device 104 utilizes the received OTP or other authentication data to authenticate the processing device 102. It is to be appreciated, however, that in other instances the processing device 102 may act as a verifying device for an OTP or other authentication data that is sent from processing device 104 (e.g., in the form of audio data over one or more audio channels). Each of the first processing device 102 and the second processing device 104 may also act as an authenticator to another processing device (e.g., an authentication server) acting as a verifier. More generally, OTPs or other authentication data transmitted by one or both of processing devices 102 and 104 may be utilized for authentication to a validating application, where the validating application may be implemented on one or both of the processing devices 102 and 104, on a separate processing device, etc.

It should be appreciated that while FIG. 1 shows an arrangement with just two processing devices 102 and 104, in other embodiments there may be three or more processing devices configured with authentication data transmission modules, audio input devices and audio output devices. For example, in some cases transmittal of an OTP or other authentication data from one processing device (e.g., processing device 102) over audio channel 106 is verified by multiple other processing devices as described in further detail below.

Today, user authentication, especially multi-factor authentication requiring the use of a something-you-have factor, is cumbersome and error prone. Users are part of the information flow, transcribing authentication data such as an OTP from the authentication device to the validating application. This introduces errors, including mistyping and other user experience challenges (e.g., users who are dyslexic). Moreover, because of the human in the loop, the amount of information that can be practically transmitted is severely limited. An RSA SecurID® token, for example, typically displays at most 8 digits.

In some embodiments the authentication data transmission modules 120 and 140 enable the processing devices 102 and 104 to emit dial tones for each digit or other character that is part of the OTP or other authentication data to be provided to a validating application. For example, the authentication data transmission module 120 of the processing device 102 can emit dial tones representing various numerical digits of an OTP via audio output device 123 while the authentication data transmission module 140 of the processing device 104 implements a listener on the receiving side utilizing audio input device 141 to listen for such tones and convert them back into digits to obtain the OTP generated at the processing device 102. Such an implementation solves the problem of errors introduced by requiring humans to transcribe data from the authentication device to the validating application. In other embodiments, more complex arrangements are provided for transmitting authentication data over an audio channel. By transmitting ephemeral data (e.g., a SecurID token code or other OTP) rather than something like a passphrase, concerns around recording and replay can be mitigated.

Advantageously, embodiments are easily adoptable and may be automated. Further advantages are provided in enabling an increase in the complexity of the data that can be transmitted per second. The hardware needed for a standard waveform transmission, assuming a baseline frequency of 44.1 kilohertz (kHz), with a bit depth of 8 bits (mono), is readily available in today's consumer world. For example, most laptops are equipped with a microphone array (e.g., 2 to 3 microphones or more), and are capable of frequencies that range from 44.1 kHz to 48 kHz at a minimum. As another example, smartphones are similarly configured with microphone arrays, and may include additional microphones dedicated to noise cancellation.

As noted above, embodiments may be used with hardware and software authentication tokens. One or both of the processing devices 102 and 104 may comprise respective hardware authentication tokens. Such hardware authentication tokens are modified to include audio input devices 121 and 141 and/or audio output devices 123 and 143. In some cases, the hardware authentication token is modified to include a speaker as the audio output device 123 or 143, or to allow connection to an external speaker (e.g., via a 3.5 mm audio port) providing the audio output device 123 or 143. If the speaker is built in to the hardware authentication token, the hardware authentication token may be further programmed with functionality for selectively enabling the speaker (e.g., to prevent a constant audible transmission). Such functionality may include a button or switch on the hardware token.

A software authentication token can leverage existing speakers on the platform on which it is running (e.g., speakers on a smartphone or laptop, etc.). In both cases, the hardware and software authentication tokens include logic (e.g., via authentication data transmission modules 120 and 140) to support digital-to-analog and analog-to-digital conversion, on-demand frequency modulation, etc. for supporting the communication of OTPs or other authentication data over audio channel 106.

Data transmission rates via waveform over audio channel 106 can be significantly higher than that achieved by typical manual input. Assuming an average user capable of typing 200 characters per minute equates to approximately 3.33 repeating characters per second. Accepting a 4 bit depth for integers, a bit rate of approximately 13.3 bits per second may be achieved by a human user transcribing data from the authentication device to the validating application. This is significantly less than the bit rate which may be achieved using audio waveforms. Assuming standard pulse-code modulation (PCM) audio, a 16 bit depth may be achieved for a single microphone channel (e.g., mono). Accepting a standard processing frequency baseline of 44.1 kHz, then multiplying 16 by 44100 results in a mono bitrate of 705.6 kilobits per second, which can be converted to 88.2 kilobytes per second. Though this is an ideal, lossless case, the Nyquist Theory states that modern analog-to-digital transformations restrict interpretable waveforms to approximately half of the recording frequency (e.g., 44.1 kHz to 22.05 kHz).

While there are some advantages to audible transmission (e.g., enabling the user to know when the processing devices 102 and 104 are transmitting OTPs or other authentication data over the audio channel 106), the noise is likely to sound like static and may be irritating to the user. Thus, some embodiments shift the transmission of the OTPs or other authentication data to human-inaudible frequencies. This requires that the audio input devices 121 and 141 used are capable of capturing such human-inaudible frequencies. Most modern consumer products are already capable of this. For example, smartphone microphones may be capable of picking up audio waves at a frequency of 21 kHz, which is outside of human hearing. The quality of the hardware of the audio input devices 121 and 141 controls which frequencies may be used for a particular implementation.

There are several obstacles to implementing systems which transmit OTPs or other authentication data over audio channel 106. Such obstacles include background noise, tone complexity, input filtration, process time, and storage. Existing software for performing audio conversion, encoding and decoding may be used, utilizing libraries compatible with various programming languages where such libraries are constantly being improved and optimized. In some embodiments, background noise is filtered out by processing devices 102 and 104 by leveraging multiple microphones or other audio input devices 121 and 141, and isolating desired input frequencies.

Tone complexity offers an ability to further increase transmission rates. This includes bit depth, frequency, the number of receiving channels, and the sample length. Sample length is easy to modulate, and involves capturing a desired audio sample over a longer period of time. However, this increase in complexity comes at a price in that additional data requires additional computation power or time needed to process the increase in data. This increase, however, may be negligible and may be handled easily using consumer grade hardware.

In some embodiments, the audio input devices 121 and 141 and the audio output devices 123 and 143 may utilize a wired connection for transmitting OTPs or other authentication data over audio channel 106. For example, headphone and microphone ports (e.g., 3.5 mm ports) may be used for the audio input devices 121 and 141 and audio output devices 123 and 143. This allows for increasing sample complexity without adding additional microphones. In some cases, a headphone port is wired to output in stereo, meaning dual channel. The headphone port can also receive input in stereo with proper configuration. Adding the microphone port, there are three channels, as microphone jacks typically support mono or single channel input.

Bit depth increases complexity by a factor of 8. It should be noted that most microphones record audio using 16 bit mono. Higher bitrates are possible, but are increasingly more impactful on system resources. Higher quality systems are capable of recording in 24 bits or 32 bit float.

Numerous frequency alterations may be used to convert and transmit OTPs or other authentication data over audio channel 106. Frequency modulation techniques can be applied in some embodiments if an OTP or other authentication data is being sent via a waveform frequency. Amplitude modulation (AM) uses changes in the amplitude of the audio wave to represent data, and frequency modulation (FM) uses changes in waveform frequency to represent data.

In some embodiments, pitch modularity may also be used, where complexity can be affected through a series of tones that vary in pitch to represent desired values. Combinations of AM, FM and pitch modulation may also be used in some embodiments.

For the bit depth and frequency discussed above, buffering and storing the transmitted audio signals should not be challenging. A 30-second sample of mono input at 44.1 kHz, for example, will yield a file size of approximately 1.292 megabytes. Modern processors are more than powerful enough to handle a stream of this size, and if properly buffered should not fill even a small pool of memory of the processing devices 102 and 104.

Moving transmission of OTPs or other authentication data to the audio channel 106 may introduce potential attack vectors that are not applicable to other communication channels. For example, an attacker can more easily intercept audio transmissions between the processing devices 102 and 104, and attempt to consume or otherwise utilize the OTPs or other authentication data that is transmitted before the intended recipient is able to do so. This "race" to the validating application is a real concern, and may be mitigated by users taking care that they are not near other potentially malicious listening devices or by using a 3.5 mm audio jack to transmit the OTPs or other authentication data over a wired audio channel.

An attacker may also try to prevent authentication by jamming the audio channel 106 used to transmit the OTPs or other authentication data (e.g., by generating a loud noise at the desired frequency) between processing devices 102 and 104. This could effectively prevent authentication, though if the amount of information being sent is not changed the user could fall back to just typing or otherwise manually transcribing the data as is conventionally done today.

An attacker may also try to create an audio waveform that would authenticate them. However, because the waveform is converted back into digital form on the receiving side, this is at least as hard as trying to guess the correct authentication information, a task which is assumed to be hard.

It is to be appreciated that the particular values given above for transmission frequencies, bit rates, etc. are presented by way of example only. Further, the ranges of such values may depend on the particular hardware of audio input devices 121 and 141 and audio output devices 123 and 143 that are used by the processing devices 102 and 104. With improvements to hardware supporting digital audio transmission, it is expected that corresponding improvements may be made in the amount and complexity of OTPs or other authentication data transmitted over audio channel 106. For example, top-end microphones are pushing recording frequencies of 96 kHz at 24 bits.

In some embodiments, variable sample length may be used as an authentication value. Thus, "time" would become a value for representing portions of an OTP or other authentication data that is transmitted over audio channel 106.

As described above, in some embodiments an OTP or other authentication data (e.g., a series of numerical digits) may be transmitted using standard dial tones. The pitch for particular numerical values, or for letters, symbols and other characters used in the OTP or other authentication data, may alternatively be determined using a custom hash function in some embodiments. Further, tones may be projected outside of human hearing as noted above.

In some embodiments, the transmission of authentication data over audio channels may use "signature" tones. For example, a speaker or other audio output device 123 or 143 of the processing device 102 or 104 may have a digital signature associated therewith, which may be represented as a set of tones that uniquely identifies that speaker or other audio output device 123 or 143. Similarly, a sequence of tones may be used as a digital signature that identifies a particular user in addition to or in place of using a sequence of tones to represent a particular audio output device 123 or 143. Such signature tones may be combined with an OTP or other authentication data that is transmitted over the audio channel 106. For example, the OTP or other authentication data may be converted to a first set of tones, which is then combined (e.g., concatenated with, interleaved with, etc.) with a second set of tones representing the signature of the user and/or audio output device that is providing transmission.

It should be appreciated that, in some cases, multiple sets of signature tones may be utilized, such as where an OTP or other authentication data is transmitted from a first processing device (e.g., processing device 102) to a second processing device (e.g., processing device 104) utilizing multiple audio output devices 123 of the first processing device 102. In such cases, for example, each of the audio output devices 123 that transmits the OTP or other authentication data (or a portion thereof) may utilize its own signature tone or tones that are verified by the processing device 104. Such different audio output devices 123, in some cases, may transmit different portions of the OTP or other authentication data, possibly over different frequencies, with different modulation, at different times, etc.

To provide additional security, some embodiments may utilize "shadow tones." The shadow tones technique may utilize multiple tones to force a microphone or other audio input device 121 or 141 of the processing devices 102 and 104 to pick up the audio transmission of an OTP or other authentication data at a specific frequency. This may be viewed as introducing noise, in the form of certain shadow tones, which the microphone or other audio input device 121 or 141 is programmed to filter out. The use of shadow tones in some embodiments may also or alternatively involve overlaying tones to produce sub-tones.

In some embodiments, a "cloud" of audio authentication may be used. With more devices providing microphones or audio input devices 121 and 141 and audio output devices 123 and 143, some embodiments may utilize receipt of multiple audio signals to verify that an OTP or other authentication data has in fact been transmitted by a particular source. This allows for enhanced security, in that a receiving processing device and/or validating application can confirm that multiple devices in a particular region (e.g., a room) can pick up audio signals which contain transmitted OTPs or other authentication data.

In some embodiments, the processing device 104 may be equipped with two or more microphones providing audio input devices 141, each of which is configured to independently receive an audio signal that the processing device 102 transmits over the audio channel 106 via an audio output device 123. In other embodiments, the processing device 104 may utilize its audio input devices 141 to receive an audio signal, and to identify an OTP or other authentication data transmitted by the processing device 102 over the audio channel 106 via audio output device 123. The processing device 104 may also utilize one or more additional audio signals that are obtained by one or more additional processing devices (not shown in FIG. 1, but assumed to be configured in a manner similar to that of processing device 104). These additional processing devices may be physically distinct from the processing device 104, and may be placed at different physical locations relative to one another. The processing device 104 may utilize the additional audio signals obtained by such additional processing devices to verify that the OTP or other authentication data was in fact transmitted by the processing device 102.

Spatial audio mapping may be used to collaborate or verify that the different audio signals were received from a same source (e.g., the processing device 102) and to confirm the location of the source for further authentication. This may be used to avoid or mitigate the risks of attacks, as the verifying processing device 104 may be configured with knowledge of the location and/or distance of an authorized source (e.g., the processing device 102) and thus may utilize spatial audio mapping to detect attacks or transmissions from malicious sources not at one or more known locations and/or distances.

In some embodiments which utilize the cloud of audio authentication, the multiple microphones or other audio input devices of the processing device 104 (and possibly additional processing devices as noted above) may each pick up or receive audio signals which contain the same portion or portions of an OTP or other authentication data. In other embodiments which utilize the cloud of audio authentication, the multiple microphones or other audio input devices of the processing device 104 (and possibly additional processing devices as noted above) may pick up or receive different portions of an OTP or other authentication data. Such different portions may partially overlap one another, or may be fully distinct. Such different portions may be designed to be picked up by different microphones or other audio input devices (e.g., they may be transmitted at different frequencies, with different modulation or other encoding, with different shadow tones known to the different microphones or other audio input devices, etc.).

Although described above with respect to collaborating input from multiple microphones or other audio input devices that receive audio signals containing transmitted OTPs or other authentication data over audio channels, it is also possible for the cloud of audio authentication to rely on multiple audio output devices transmitting such audio signals over the audio channels. In some embodiments, the same OTP or authentication data may be transmitted by multiple speakers or other audio output devices 123 of the processing device 102. The multiple speakers or other audio output devices 123 may transmit the same OTP or other authentication data at different frequencies, with different modulation, with different encoding, etc. The multiple speakers or other audio output devices 123 may also use overlapping frequencies and the same modulation and encoding, but using different shadow and/or signature tones as described above. In other embodiments, different speakers or other audio output devices 123 may transmit different portions of an OTP or other authentication data. Such different portions may use the same or different frequencies, modulation, encoding, shadow tones, signature tones, etc.

At least portions of the authentication transmission modules 120 and 140 may be implemented at least in part in the form of software that is stored in memory and executed by a processor. The authentication transmission modules 120 and 140 may also comprise functional modules that are implemented via hardware, software, or a combination of hardware and software.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Although not explicitly shown in FIG. 1, one or more input-output devices such as keyboards, displays or other types of input-output devices may be used to support one or more user interfaces to the processing devices 102 and 104, as well as to support communication between the processing devices 102 and 104 and other related systems and devices not explicitly shown.

It is to be appreciated that the particular set of elements shown in FIG. 1 in system 100 is presented by way of example, and in other embodiments additional or alternative elements may be used. Thus, another embodiment may include additional networks, devices, servers, etc. For example, a system may include multiple additional processing devices that communicate with one another via one or more networks, via one or more audio channels, etc.

One or both of the processing devices 102 and 104 of system 100 may in some embodiments be part of cloud infrastructure such as an Amazon Web Services (AWS) system. Other examples of cloud-based systems that can be used include Virtustream Enterprise Cloud, Virtustream Storage Cloud, Google Cloud Platform (GCC) and Microsoft Azure.

The processing devices 102 and 104 of system 100 may also be implemented using one or more processing platforms. The processing devices 102 and 104 can illustratively include particular arrangements of compute, storage and network resources. The processing devices 102 and 104, or components thereof such as the authentication data transmission modules 120 and 140, may be implemented on respective distinct processing platforms, although numerous other arrangements are possible. For example, in some embodiments at least portions of the processing devices 102 and 104 may be implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the processing devices 102 and 104, or portions or components thereof, to reside in different data centers. Numerous other distributed implementations are possible.

Additional examples of processing platforms utilized to implement portions of the system 100 in illustrative embodiments will be described in more detail below in conjunction with FIGS. 6 and 7.

Figure 2:
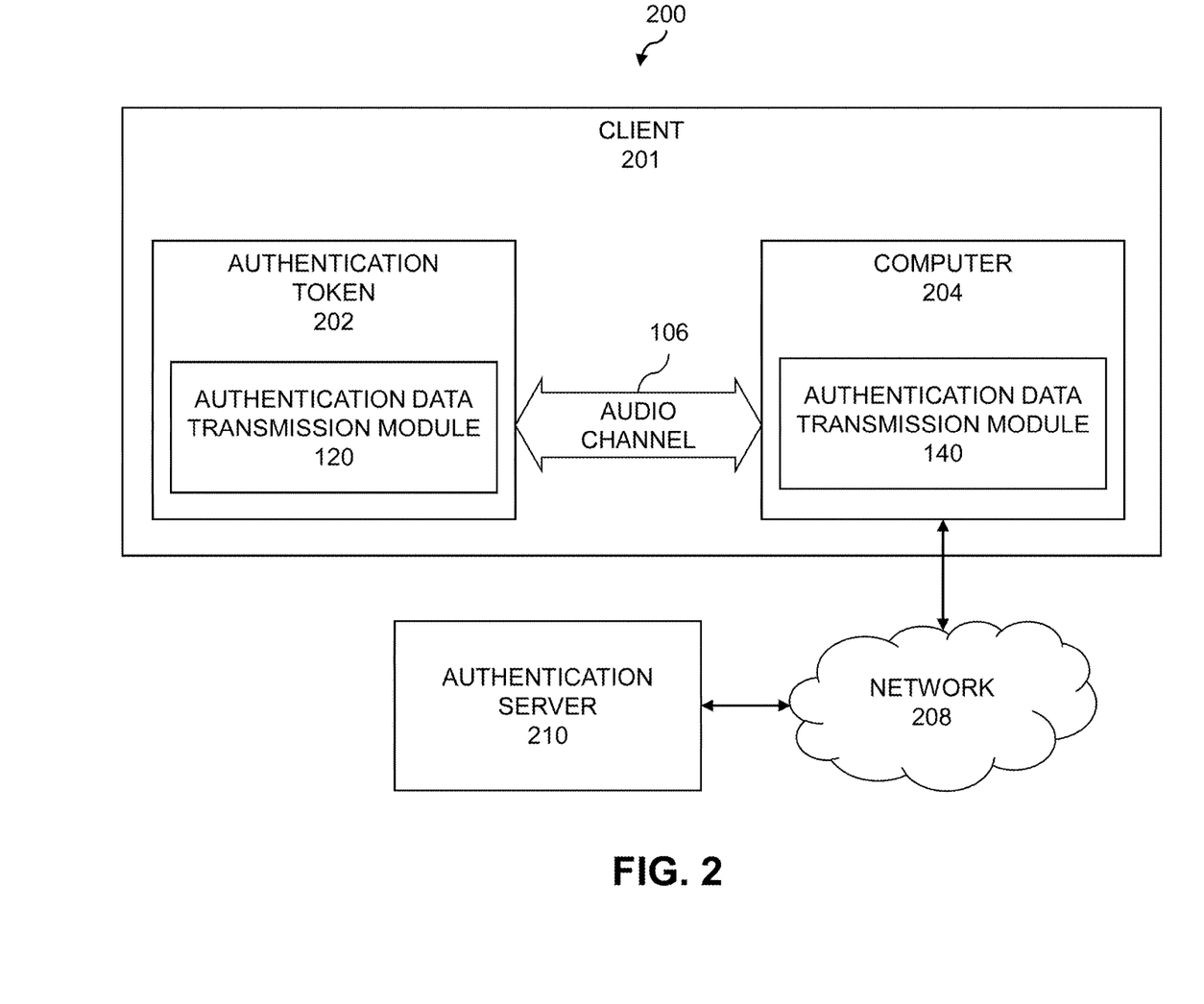
FIG. 2 shows a possible implementation of the FIG. 1 system including an authentication token and an authentication server in an illustrative embodiment.

FIG. 2 shows an example of an information processing system 200 corresponding generally to an implementation of the information processing system 100. In the information processing system 200, a client 201 and authentication server 210 communicate over a network 208. The term "authentication server" should be understood to encompass any type of processing device or set of such devices that is operative to authenticate an OTP or other authentication data provided by another processing device. An authentication server need not be a network-based server, and may be implemented as a portion of a device that performs other functions, as a combination of multiple servers or other devices, or in other forms.

The client 201 comprises an authentication token 202 and computer 204. The authentication token 202, which implements authentication data transmission module 120, is an example of the processing device 102. The computer 204, which implements authentication data transmission module 140, is an example of the processing device 104. The authentication token 202 communicates with the authentication server 210 via a host device such as computer 204. For example, the authentication token 202 may provide an OTP or other authentication data to the authentication server 210 by first transmitting the OTP or other authentication data over audio channel 106 to the computer 204, which then sends such authentication data to the authentication server 210 over network 208.

In some embodiments, the authentication token 202 and computer 204 may be connected via a wired interface such as a universal serial bus (USB) interface, or may connect wirelessly via a Bluetooth connection, an IEEE 802.11 connection, a Near Field Communication (NFC) interface, etc. in addition to or as an alternative to being connected via audio channel 106.

The computer 204 may be a desktop or portable personal computer, mobile telephone, personal digital assistant (PDA), wireless email device, workstation, kiosk, television set-top box, game console, or any other processing device that provides an interface between authentication token 202 and authentication server 210. Information, including the OTPs or other authentication data of the authentication token 202, may be transmitted to the authentication server 210 via the computer 204.

The authentication token 202 may be a hardware authentication token or a software authentication token. In some embodiments, the authentication token 202 may comprise an RSA SecurID® user authentication token, suitably modified as disclosed herein. It should also be noted that a given authentication token need not take the form of a stand-alone hardware token. For example, such a device may be incorporated into another processing device, such as a computer, mobile telephone, etc. In one such implementation, the computer 204 and authentication token 202 may be combined into a single processing device that communicates with the authentication server 210.

Authentication tokens include both time-synchronous and event-synchronous tokens. In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, a part of Dell EMC.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other types of authentication tokens include hybrid time-synchronous and event-synchronous tokens.

In some embodiments, passcodes can be communicated directly from the authentication token 202 to computer 204 via the audio channel 106, or another element of an authentication system, instead of being displayed to the user. The authentication token 202 may thus be referred to as a connected token, which saves the user the trouble of reading the passcode from the display and manually entering it into the computer 204.

The above arrangements may be viewed as examples of what are more generally referred to herein as hardware authentication tokens. However, authentication tokens can also be implemented in the form of software installed on a computer, mobile phone or other processing device. Like hardware authentication tokens, software authentication tokens can be implemented as time-synchronous, event-synchronous, or hybrid time-synchronous and event-synchronous tokens.

Hardware and software authentication tokens and other types of OTP devices are typically programmed with a random seed or other type of key that is also stored in a token record file. The record file is loaded into authentication server 210, such that the authentication server 210 can create matching passcodes for the authentication token 202 based on the key and the current time or current event count.

In order to protect authentication tokens such as authentication token 202 against cloning attacks, the keys used may be periodically refreshed using an approach known as drifting keys, in which a set of secret keys shared between authentication token 202 and authentication server 210 evolve randomly over time. Periodic refresh operations are applied to the set of keys, typically at the start of respective time periods.

In the system 200, the authentication token 202 may be used by the computer 204 to authenticate a user of the computer 204 to the authentication server 210. In an authentication session, the authentication token 202 via authentication data transmission module 120 generates an OTP or other authentication data that is transmitted to the computer 204 over audio channel 106. The OTP or other authentication data is then transmitted from the computer 204 to the authentication server 210 via network 208. The computer 204 may utilize authentication transmission module 140 to suitably convert the received audio data into a format suitable for transmission to the authentication server 210 over network 208, and possibly to verify transmission from an approved source such as authentication token 202 utilizing cloud of audio authentication techniques described above and elsewhere herein. The authentication server 210 uses the transmitted OTP or other authentication data to determine the authenticity of the authentication token 202, and thus the computer 204.

Figure 3:
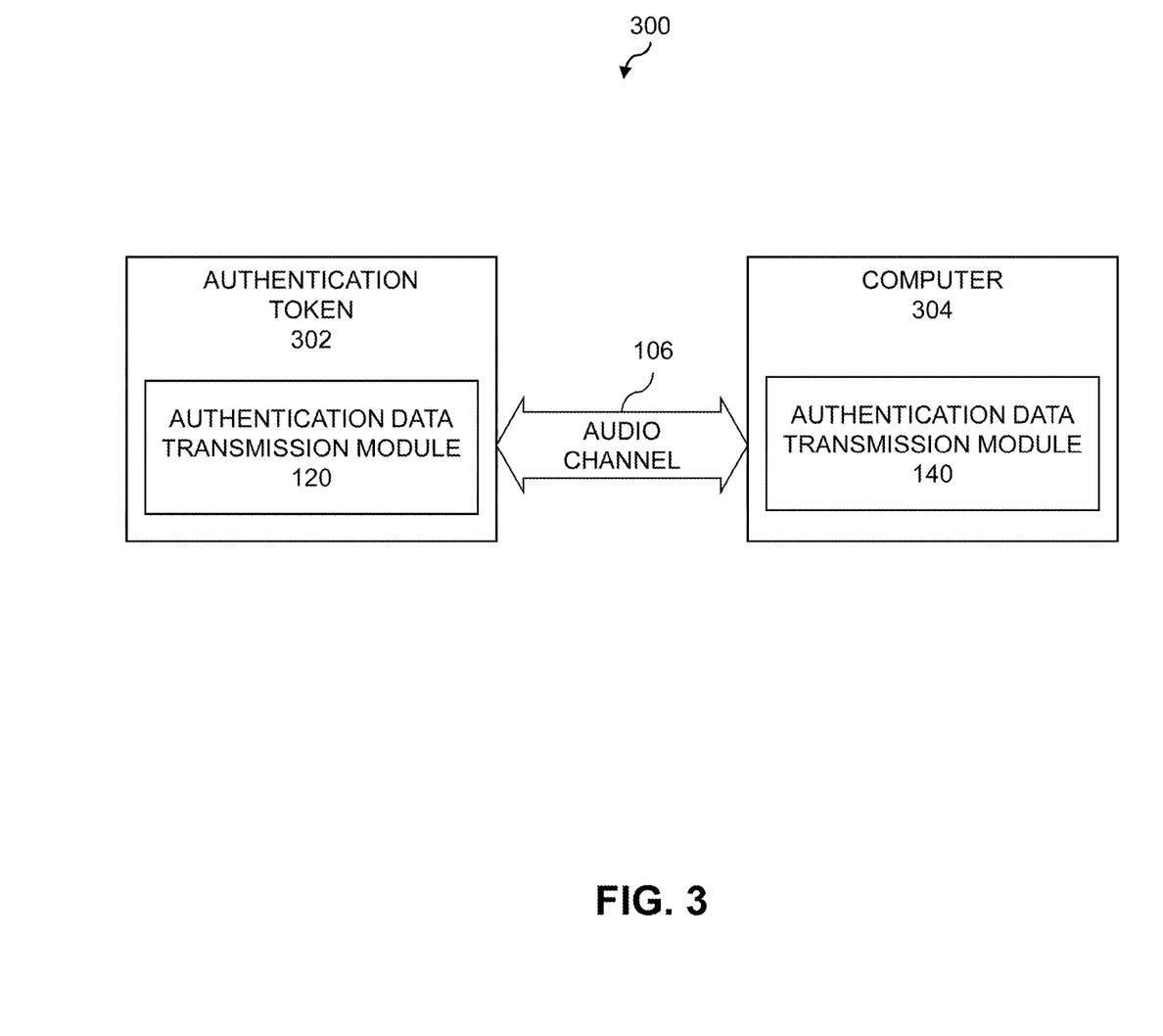
FIG. 3 shows another possible implementation of the FIG. 1 system including an authentication token and a computing device in an illustrative embodiment.

FIG. 3 illustrates another example of an information processing system 300 corresponding generally to an implementation of information processing system 100. In the information processing system 300, an authentication token 302 communicates with computing device 304 over the audio transmission channel 106. The authentication token 302 is an example of the processing device 102, and the computing device 304 is an example of the processing device 104. The authentication token 302 implements authentication data transmission module 120 and the computing device 304 implements authentication data transmission module 140.

In the information processing system 300, the authentication token 302 via authentication data transmission module 120 generates and transmits an OTP or other authentication data to the computing device 304 for authenticating to the computing device, rather than an external server as in system 200. The computing device 304 utilizes authentication data transmission module 140 to convert audio received over the audio channel 106 to obtain the transmitted OTP or other authentication data to determine the authenticity of the authentication token 302.

Although not explicitly shown in FIGS. 2 and 3, the authentication token 202, computer 204, authentication token 302, computing device 304 may comprise respective processors, memories, network interfaces, audio input devices, and audio output devices similar to the processing devices 102 and 104 of system 100. The authentication server 210 may also comprise a processor, memory and network interface.

It is to be appreciated that the systems 200 and 300 may in some embodiments be combined. For example, an authentication token may be used for authenticating to a computer as well as a remote server, or may be used for authenticating to multiple distinct remote servers. The authentication token can store separate seed or key values for use in generating OTPs or other authentication data for each of the servers, computing devices or validating applications to which it authenticates.

Figure 4:
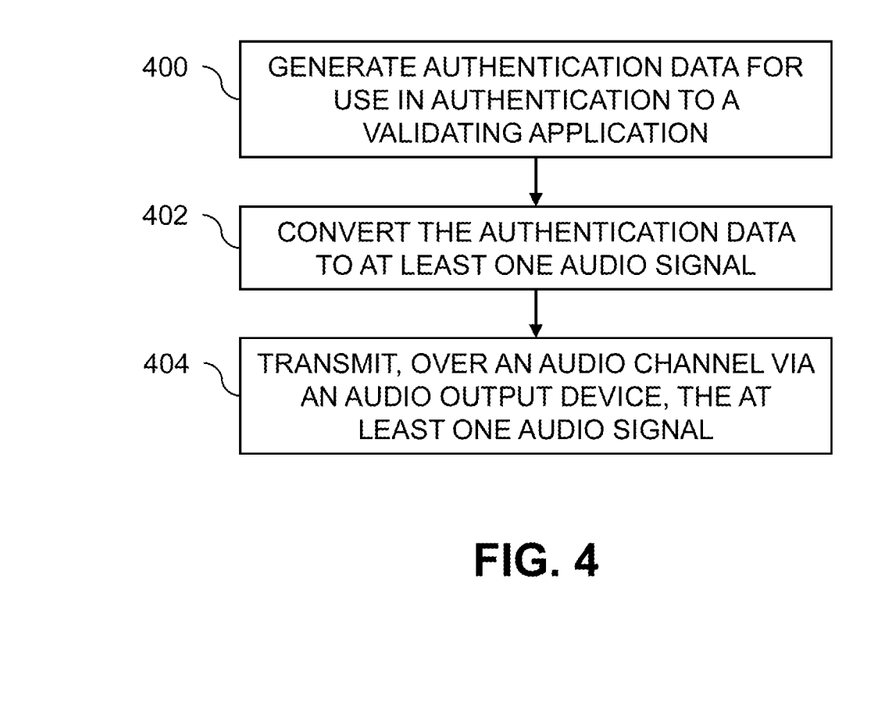
FIG. 4 is a flow diagram of an exemplary process for transmitting authentication data over an audio channel in an illustrative embodiment.
Figure 5:
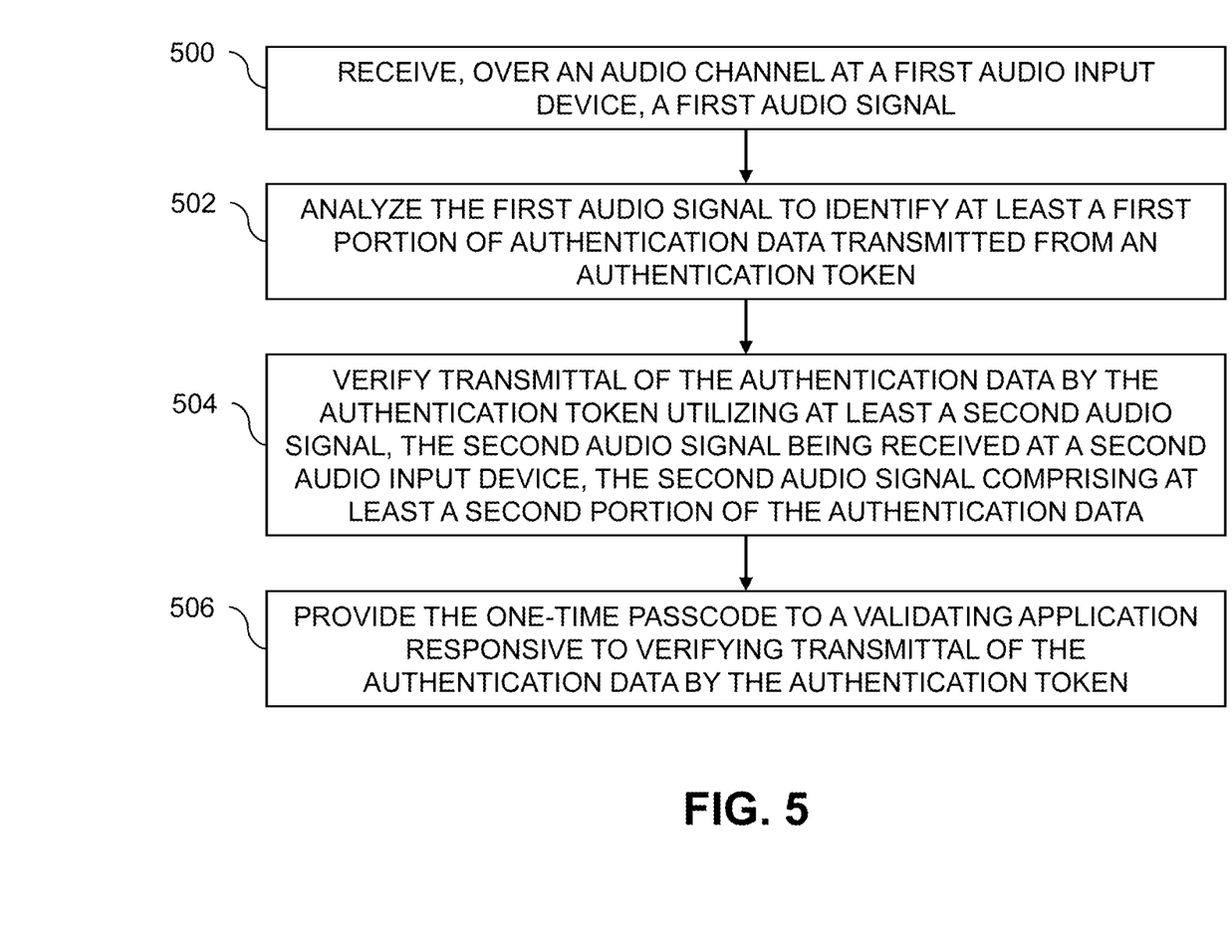
FIG. 5 is a flow diagram of an exemplary process for receiving and verifying authentication data transmitted over an audio channel in an illustrative embodiment.

Exemplary processes for transmitting OTPs or other authentication data over audio channels will now be described in more detail with reference to the flow diagrams of FIGS. 4 and 5. More particularly, FIG. 4 illustrates a process for generating and transmitting the OTPs or other authentication data, while FIG. 5 illustrates a process for receiving, identifying and verifying transmittal of such OTPs or other authentication data. It is to be understood that these particular processes are only examples, and that additional or alternative processes for transmitting OTPs or other authentication data over audio channels can be carried out in other embodiments.

In these embodiments, the FIG. 4 process includes steps 400 through 404 and the FIG. 5 process includes steps 500 through 506. These steps are assumed to be performed by the processing device 102 or 104 of FIG. 1, the authentication token 202 and computer 204 of FIG. 2, or the authentication token 302 and computing device 304 of FIG. 3 utilizing the authentication transmission modules 120 and 140.

The FIG. 4 process begins with step 400, generating an OTP or other authentication data for use in authentication to a validating application. In some embodiments, the OTP generated in step 400 is used as one factor (e.g., a something-you-have factor) in a multi-factor authentication process with the validating application. The FIG. 4 process may be performed by an authentication token, which may be a standalone hardware authentication token, or a software authentication token running on another processing device. The OTP generated in step 400 may be in accordance with a time-synchronous, an event-synchronous or a hybrid time and event-synchronous authentication token configuration.

In step 402, the OTP or other authentication data is converted to at least one audio signal. Step 402 may use a variety of techniques for such conversion, including but not limited to using variable sample lengths or time to represent values, using dial tones or other pitches to represent numerical digits or other characters, using tones at human-audible and/or human-inaudible frequencies, using various modulation and encoding, etc.

In some embodiments, step 402 includes generating a first portion of the at least one audio signal representing the OTP or other authentication data, generating at least a second portion of the at least one audio signal representing a device signature of an audio output device that will be utilized to transmit the audio signal, and combining the first portion and the second portion to generate the at least one audio signal. This combination may include concatenating the first and second portions, interleaving the first and second portions, overlaying tones from the first and second portions, etc. In some embodiments, the second portion of the audio signal (e.g., the device signature) may be used as a "header" or other identifier for the at least one audio signal, where receiving input devices are configured to monitor for certain known device signatures and only record or pick up audio signals after first confirming that a matching device signature has been recognized.

In other embodiments, step 402 includes generating a first portion of the at least one audio signal representing the OTP or other authentication data, generating at least a second portion of the at least one audio signal representing pre-defined noise, and combining the first portion and the second portion to generate the at least one audio signal. In this case, the combination may include overlaying the tones of the first and second portions. The at least one audio signal combined in this manner is configured to be filtered by a receiving audio input device with knowledge of the pre-defined noise to obtain the OTP or other authentication data.

In still other embodiments, step 402 may include combinations of the above approaches, such as generating a first portion of the at least one audio signal that represents the OTP or other authentication data, generating a second portion of the at least one audio signal that represents a device signature of an audio output device that will be utilized to transmit the audio signal, and generating a third portion of the at least one audio signal that represents pre-defined noise. In some cases, the first and second portions may first be combined (e.g., by concatenating or interleaving tones thereof, by at least partially overlaying tones of the first and second portions, etc.), followed by overlaying the combined first and second portions with the third portion representing the pre-defined noise. The at least one audio signal combined in this manner is configured to be filtered by a receiving audio input device that has knowledge of the pre-defined noise to obtain the combined first and second portions, and then further analyzed or filtered to separate out the first and second portions to verify the device signature and the OTP or other authentication data. In other cases, however, the order of combining the first, second and third portions may vary. For example, in some cases the first and third portions may first be combined, followed by combination with the second portion. Various other examples are possible.

The FIG. 4 process continues with step 404, transmitting, over an audio channel via an audio output device, the at least one audio signal. The transmitted audio signal is configured to be received and processed by another device, which analyzes the at least one audio signal to obtain the OTP or other authentication data and provide the OTP or other authentication data to the validating application. In some embodiments, the audio output device used to transmit the at least one audio signal in step 404 is at least one speaker, where the audio channel is over the air to at least one microphone of the receiving processing device. In other embodiments, the audio output device comprises a headphone port, where the audio channel is a wired connection between the headphone port and a microphone port of the receiving processing device. It should be appreciated that, in some cases, a headphone or microphone port may be configured to both transmit and receiving audio signals, and thus the use of the terms "headphone port" and "microphone port" are used simply by way of illustration. More generally, the wired connection may be between any two audio ports suitably configured to transmit and receive audio signals.

In some embodiments, the device performing the FIG. 4 process includes a display that is configured to present a first number of characters (e.g., alphanumeric characters, special characters, symbols, etc.) at a given time. The OTP or other authentication data that is transmitted in step 404 may comprise a second number of characters which is greater than the first number of characters. In other words, using the audio signal to transmit the OTP or other authentication data facilitates the transfer of longer and more complex OTPs and other authentication data, without requiring a human user to transcribe such data that is presented on a display.

The FIG. 5 process begins with step 500, receiving a first audio signal over an audio channel at a first audio input device. In step 502, the first audio signal is analyzed to identify at least a first portion of an OTP or other authentication data that is transmitted from an authentication token. Step 502 may, in some embodiments, include applying a predefined filter to the first audio signal to remove noise (e.g., shadow tones) that was introduced to the first audio signal by the authentication token prior to transmittal. In some embodiments, the predefined filter may be further associated with a particular speaker or other audio output device, and thus step 502 may include identifying a set of signature tones in the first audio signal to select from a plurality of filters associated with different speakers or other audio output devices. It should also be noted that the signature tones may identify a particular user or other type of identifier in addition to a particular speaker or other audio output device, and thus there may be multiple filters associated with a same speaker or other audio output device but associated with different users, different validating applications, etc.

In step 504, transmittal of the OTP or other authentication data by the authentication token is verified utilizing at least a second audio signal. The OTP or other authentication data is provided to a validating application in step 506, responsive to verifying transmittal by the authentication token in step 504.

The second audio signal is received at a second audio input device, and comprises at least a second portion of the OTP or other authentication data. In some embodiments, the first and second audio input devices comprise first and second microphones or other audio input devices of a same device. In other embodiments, the first and second audio input devices may comprise first and second microphones or other audio input devices of different devices. Such different devices may be placed at different physical locations with respect to the authentication token. Spatial audio mapping may be used to verify that the first and second audio signals were sent from the same source (e.g., from a same location). The first and second audio signals may also be analyzed to determine the respective times at which they were transmitted, where such information may represent a third portion of an OTP or other authentication data (e.g., a first offset between transmittal of the first audio signal and the second audio signal may represent a first value, while a second offset between transmittal of the first audio signal and the second audio signal may represent a second value, etc.).

The first and second audio input devices may be configured to monitor or otherwise pick up audio signals at respective first and second predefined audio frequencies. Thus, verifying transmittal in step 504 may include verifying that the first audio signal is received over the first predefined audio frequency and that the second audio signal is received over the second predefined audio frequency.

In some embodiments, the first and second audio signals are the same audio signal, and thus the first and second portions are the same. In other embodiments, the first and second audio signals may be different (e.g., they may be respective audio signals transmitted at a different frequencies, with different modulation or encoding, with different signature or shadow tones, etc.). In such cases, the first and second audio signals may contain the same or different portions of the OTP or other authentication data transmitted from the authentication token. Where the authentication token transmits the same portions of the OTP or other authentication data utilizing two different speakers or other audio output devices, verifying transmitting in step 504 may ensure that the same data is able to be picked up by different audio input devices. Where the authentication token transmits different portions of the OTP or other authentication data (where such different portions may at least partially overlap) utilizing two different speakers or other audio output devices, verifying transmitting in step 504 may ensure that such different data is able to be picked up by different audio input devices and suitably combined to obtain the full OTP or other authentication data. In either case, the different speakers or other audio output devices transmitting the first and second audio signals may have or utilize at least one of different associated signature tones, different shadow tones, different modulation, different encoding, different frequencies, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for transmitting authentication data over audio channels will now be described in greater detail with reference to FIGS. 6 and 7. Although described in the context of system 100, these platforms may also be used to implement at least portions of other information processing systems such as systems 200 and 300 in other embodiments.

Figure 6:
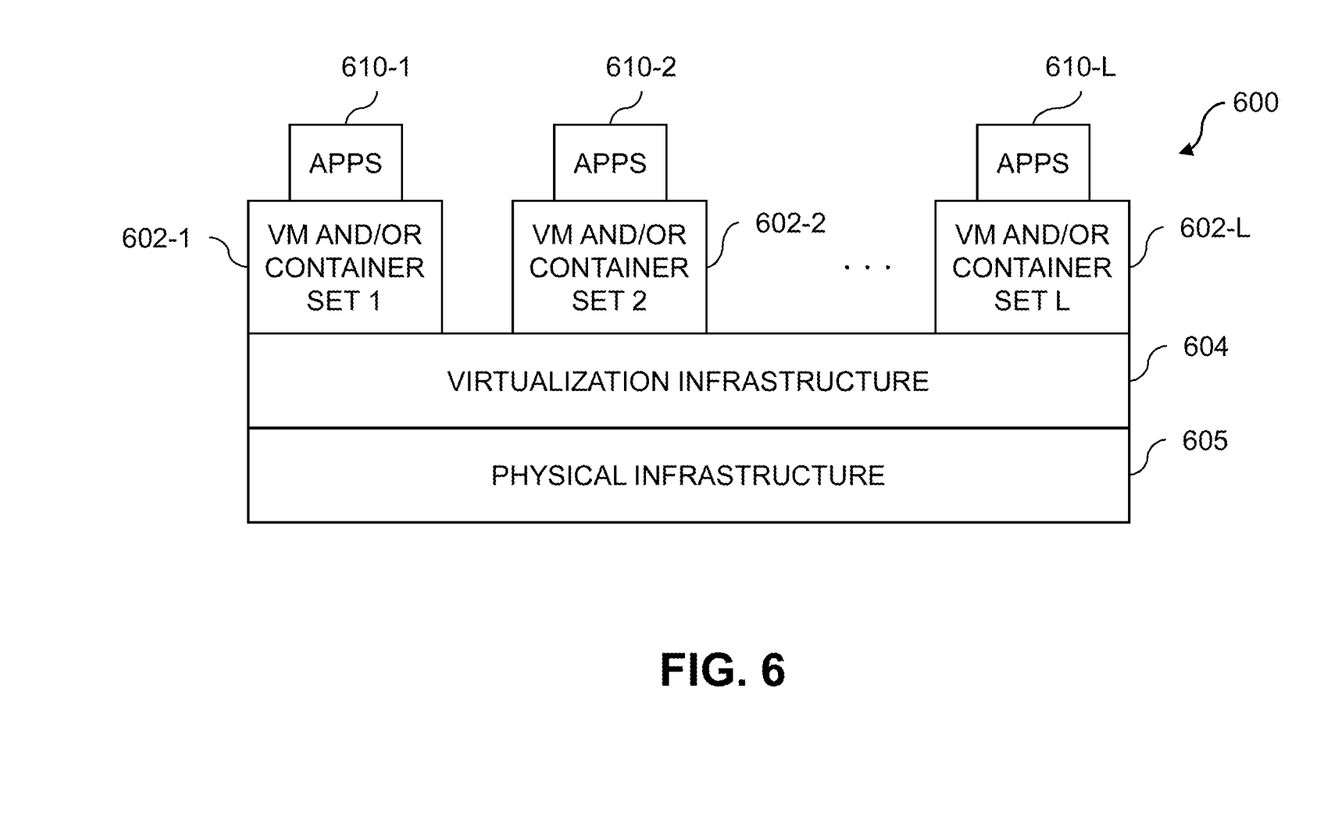
FIGS. 6 and 7 show examples of processing platforms that may be utilized to implement at least a portion of an information processing system in illustrative embodiments.
Figure 7:
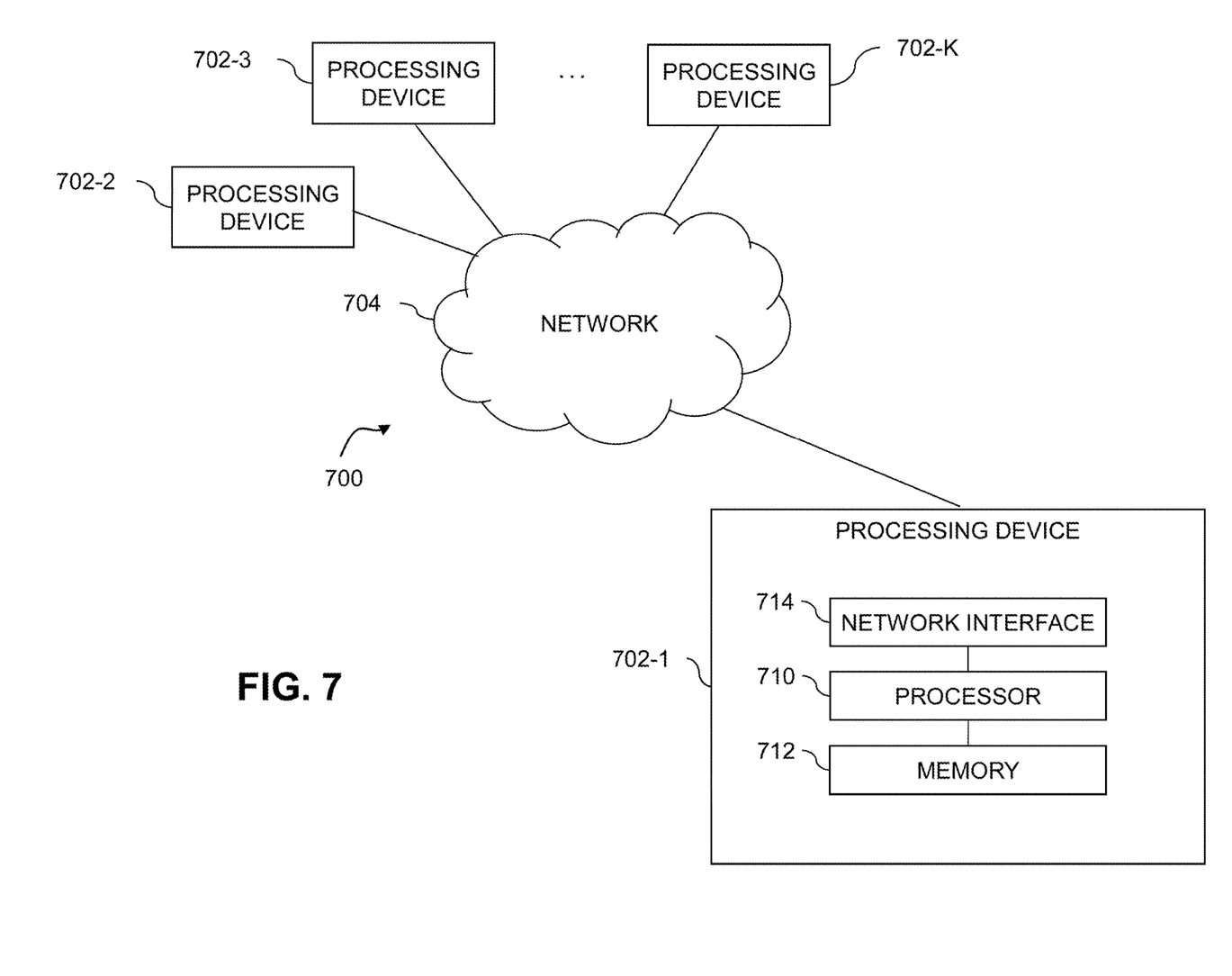

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. An example of a hypervisor platform that may be used to implement a hypervisor within the virtualization infrastructure 604 is the VMware® vSphere® which may have an associated virtual infrastructure management system such as the VMware® vCenter®. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for transmitting authentication data over audio channels as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, audio input devices, audio output devices, audio channels, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    receiving, over an audio channel at a first audio input device, a first audio signal;
    analyzing the first audio signal to identify at least a first portion of authentication data transmitted from an authentication token;
    verifying transmittal of the authentication data by the authentication token utilizing at least a second audio signal, the second audio signal being received at a second audio input device different than the first audio input device, the second audio signal comprising at least a second portion of the authentication data; and
    providing the authentication data to a validating application responsive to verifying transmittal of the authentication data by the authentication token;
    wherein the first audio signal and the second audio signal have at least one of different frequencies, different modulation and different encoding; and wherein the method is performed by at least one processing device comprising a processor coupled to a memory.

2. The method of claim 1 wherein the first audio signal and the second audio signal comprise a same audio signal.

3. The method of claim 1 wherein the first audio input device comprises a first microphone of a first processing device and the second audio input device comprises a second microphone of the first processing device.

4. The method of claim 1 wherein the first audio input device comprises a first microphone of a first processing device and the second audio input device comprises a second microphone of a second processing device, the first processing device and the second processing device being placed at different physical locations with respect to the authentication token.

5. The method of claim 1 wherein analyzing the first audio signal to identify the first portion of the authentication data comprises applying a predefined filter to the first audio signal to remove noise introduced to the first audio signal by the authentication token prior to transmittal of the first audio signal.

6. The method of claim 1 wherein verifying the transmittal of the authentication data by the authentication token comprises utilizing spatial audio mapping to confirm that the first audio signal and the second audio signal are received from a same source comprising the authentication token.

7. The method of claim 1 wherein the first audio input device is configured to monitor a first predefined audio frequency and the second audio input device is configured to monitor a second predefined audio frequency different than the first predefined audio frequency, and wherein verifying transmittal of the authentication data by the authentication token comprises verifying that the first audio signal is received over the first predefined audio frequency and that the second audio signal is received over the second predefined audio frequency.

8. The method of claim 1 wherein verifying transmittal of the authentication data by the authentication token comprises analyzing at least one of the first audio signal and the second audio signal to identify a set of tones comprises a predefined signature associated with at least one audio output device of the authentication token.

9. A computer program product comprising a non-transitory processor-readable storage medium having stored therein program code of one or more software programs, wherein the program code when executed by the at least one processing device causes the at least one processing device to perform the method of claim 1.

10. An apparatus comprising:
at least one processing device comprising:
a first audio input device; and
a processor coupled to a memory;
the at least one processing device being configured:
to receive, over an audio channel at the first audio input device, a first audio signal;
to analyze the first audio signal to identify at least a first portion of authentication data transmitted from an authentication token;
to verify transmittal of the authentication data by the authentication token utilizing at least a second audio signal, the second audio signal being received at a second audio input device different than the first audio input device, the second audio signal comprising at least a second portion of the authentication data; and to provide the authentication data to a validating application responsive to verifying transmittal of the authentication data by the authentication token;
wherein the first audio signal and the second audio signal have at least one of different frequencies, different modulation and different encoding.

11. A method comprising:
generating authentication data for use in authentication to a validating application;
converting the authentication data to at least one audio signal; and
transmitting, over an audio channel via an audio output device, the at least one audio signal, the transmitted audio signal being processed to obtain the authentication data and to provide the authentication data to the validating application;
wherein converting the authentication data to the at least one audio signal comprises generating first and at least second portions of the at least one audio signal;
wherein the first and second portions of the at least one audio signal have at least one of different frequencies, different modulation and different encoding; and
wherein the method is performed by at least one processing device comprising a processor coupled to a memory.

12. A computer program product comprising a non-transitory processor-readable storage medium having stored therein program code of one or more software programs, wherein the program code when executed by the at least one processing device causes the at least one processing device to perform the method of claim 11.

13. An apparatus comprising:
a first processing device comprising:
an audio output device; and
a processor coupled to a memory;
the first processing device being configured:
to generate authentication data for use in authentication to a validating application;
to convert the authentication data to at least one audio signal; and
to transmit, over an audio channel via the audio output device, the at least one audio signal to at least a second processing device, the second processing device processing the transmitted at least one audio signal to obtain the authentication data and to provide the authentication data to the validating application;
wherein converting the authentication data to the at least one audio signal comprises generating first and at least second portions of the at least one audio signal; and
wherein the first and second portions of the at least one audio signal have at least one of different frequencies, different modulation and different encoding.

14. The apparatus of claim 13 wherein the first processing device comprises a hardware authentication token.

15. The apparatus of claim 13 wherein the first processing device comprises a software authentication token.

16. The apparatus of claim 13 wherein converting the authentication data to the at least one audio signal comprises:
generating the first portion of the at least one audio signal representing the authentication data;
generating at least the second portion of the at least one audio signal representing a device signature of the audio output device; and
combining the first portion and the second portion to generate the at least one audio signal.

17. The apparatus of claim 13 wherein converting the authentication data to the at least one audio signal comprises:
- generating the first portion of the at least one audio signal representing the authentication data;
- generating at least the second portion of the at least one audio signal representing pre-defined noise; and
- combining the first portion and the second portion to generate the at least one audio signal, the at least one audio signal being configured to be filtered by a receiving audio input device with knowledge of the pre-defined noise to obtain the authentication data.

18. The apparatus of claim 13 wherein the audio output device comprises at least one speaker and the audio channel is over the air to at least one microphone of the second processing device.

19. The apparatus of claim 13 wherein the audio output device comprises a first audio port and the audio channel comprises a wired connection between the first audio port and a second audio port of the second processing device.

20. The apparatus of claim 13 further comprising a display configured to present a first number of characters, wherein the authentication data transmitted as the at least one audio signal over the audio channel comprises a second number of characters greater than the first number of characters.

* * * * *